(12) United States Patent
Cao

(10) Patent No.: US 12,339,196 B2
(45) Date of Patent: Jun. 24, 2025

(54) APPARATUS FOR DETERMINING OIL LEAKAGE AND ROBOT USING THE APPARATUS

(71) Applicant: ABB Schweiz AG, Baden (CH)

(72) Inventor: Xiaodong Cao, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 332 days.

(21) Appl. No.: 18/245,113

(22) PCT Filed: Sep. 21, 2020

(86) PCT No.: PCT/CN2020/116397
§ 371 (c)(1),
(2) Date: Mar. 13, 2023

(87) PCT Pub. No.: WO2022/056895
PCT Pub. Date: Mar. 24, 2022

(65) Prior Publication Data
US 2023/0349786 A1    Nov. 2, 2023

(51) Int. Cl.
*G01M 3/04* (2006.01)
*F16H 57/029* (2012.01)
*F16N 29/00* (2006.01)

(52) U.S. Cl.
CPC .......... *G01M 3/045* (2013.01); *F16H 57/029* (2013.01); *F16N 29/00* (2013.01)

(58) Field of Classification Search
CPC ....... G01M 3/045; F16H 57/029; F16N 29/00
See application file for complete search history.

(56) References Cited

U.S. PATENT DOCUMENTS

| | | | |
|---|---|---|---|
| 2004/0232620 A1 | 11/2004 | Bock | |
| 2023/0280232 A1* | 9/2023 | Cao | G01M 3/186 73/40 |
| 2024/0181662 A1* | 6/2024 | Cao | B25J 19/0075 |
| 2024/0250575 A1* | 7/2024 | Kim | F16J 15/3288 |

FOREIGN PATENT DOCUMENTS

| | | |
|---|---|---|
| CN | 204165716 U | 2/2015 |
| CN | 108760162 A | 11/2018 |
| CN | 110271785 A | 9/2019 |
| DE | 102011005836 B3 | 6/2012 |
| EP | 1916509 B1 | 12/2011 |
| EP | 2510264 B1 | 8/2017 |
| WO | 2018156313 A1 | 8/2018 |

* cited by examiner

*Primary Examiner* — Eric S. McCall
(74) *Attorney, Agent, or Firm* — Greenberg Traurig, LLP

(57) ABSTRACT

Embodiments of the present disclosure provide an apparatus for determining oil leakage of a gearbox and an associated robot. The apparatus comprises a swellable ring arranged surrounding an output shaft of a motor coupled to the gearbox, the swellable ring, when contacting oil, swells to apply a radial force to the output shaft; and a controller configured to detect the oil leakage by detecting at least one of the following caused by the applied radial force: a torque change on the output shaft, or a change in a current for driving the motor. With the apparatus, before oil leaks into the motor, the user already knows or the motor has already been stopped. In this case, the robot using the apparatus can be operated more safely.

20 Claims, 3 Drawing Sheets

APPARATUS FOR DETERMINING OIL LEAKAGE AND ROBOT USING THE APPARATUS

CROSS-REFERENCE TO RELATED APPLICATIONS

This is a national stage application claiming priority to International patent application Serial No.: PCT/CN2020/116397, filed on Sep. 21, 2020; which is herein incorporated by reference in its entirety.

FIELD

Embodiments of the present disclosure generally relate to a robot, and more specifically, to an apparatus for determining oil leakage of a gearbox used in a joint of a robot.

BACKGROUND

Robots are widely-used automation mechanisms that increase operational efficiency and accuracy. A robot typically comprises robot arm links and joints. The robot arm link can be driven to rotate or move by a motor arranged in the joint or a base. To meet the reduction ratio requirements, a gearbox needs to be arranged between the motor and the robot arm links to be driven. The gearbox is a device that uses gears and gear trains to provide speed and torque conversions from a rotating power source to another device.

Oil is usually provided in the gearbox to provide lubrication for the gears and other components. Besides the lubrication function for the individual elements to substantially reduce friction, oil in the gearbox can also cool the heated subassemblies as well as mitigate and attenuate gear strokes. In addition, it reduces vibration, protects against corrosion, and keeps everything clean.

For robotic applications, a motor is typically coupled to a gearbox with the motor's shaft extending into an oil cavity of the gearbox. The aging of seals used to seal the oil cavity results in problems in preventing oil in the oil cavity from entering the motor and thereby adversely affecting the operation of the motor.

SUMMARY

Embodiments of the present disclosure provide an apparatus for determining oil leakage of a gearbox and an associated robot to at least in part solve the above and other potential problems.

In a first aspect, an apparatus for determining oil leakage of a gearbox is provided. The apparatus comprises a swellable ring arranged surrounding an output shaft of a motor coupled to the gearbox, the swellable ring, when contacting oil, swells to apply a radial force to the output shaft; and a controller configured to detect the oil leakage by detecting at least one of the followings caused by the applied radial force: a torque change on the output shaft, or a change in a current for driving the motor.

With the apparatus according to embodiments of the present disclosure, before oil leaks into the motor, the user already knows of the leakage or the motor has already been stopped. In this case, the user may only need to replace the damaged or aging seal ring to restore the robot joint to a normal operation state. In this way, maintenance costs can be reduced. More importantly, the robot using the apparatus according to embodiments of the present disclosure can be operated more safely.

In some embodiments, the apparatus further comprises a housing arranged on a fixed part of the motor and comprising a receiving portion for receiving the swellable ring. In this way, the apparatus can be more easily mounted on the motor.

In some embodiments, the swellable ring is arranged in contact with a side of the receiving portion away from the output shaft. This arrangement can easily achieve the radial force to be applied on the output shaft.

In some embodiments, the swellable ring comprises a swelling portion made of a functional oil-absorbing material such that the swelling portion swells when the swelling portion contacts oil. The oil swelling rubber can ensure the apparatus to swell and to apply radial force to the output shaft, improving the reliability of the apparatus.

In some embodiments, the swellable ring further comprises a contacting portion arranged on a side of the swelling portion adjacent to the output shaft in a radial direction, and wherein the contacting portion is made of a nitrile rubber. The contacting portion can ensure sufficient radial force to be applied to the output shaft, so that the torque change on the output shaft, or the change in the current for driving the motor can be detected. In this way, the reliability of the apparatus is further improved.

In some embodiments, the functional oil-absorbing material comprises an oil swelling rubber.

In some embodiments, the apparatus further comprises an additional sleeve arranged on the output shaft and adapted to rotate with the output shaft. This arrangement can improve the adaptability of the apparatus.

In some embodiments, the swellable ring is arranged between the additional sleeve and the housing.

In some embodiments, the apparatus further comprises a radial sealing arranged between the additional sleeve and the housing.

In some embodiments, the controller is coupled to a power cable or a driver of the motor to detect the change in the current for driving the motor.

In a second aspect, a robot is provided. The robot comprises at least one joint and at least one apparatus according to the first aspect as mentioned above.

It is to be understood that the Summary is not intended to identify key or essential features of embodiments of the present disclosure, nor is it intended to be used to limit the scope of the present disclosure. Other features of the present disclosure will become readily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, the same reference numerals usually represent the same components.

DETAILED DESCRIPTION

The present disclosure will now be discussed with reference to several example embodiments. It is to be understood these embodiments are discussed only for the purpose of enabling those persons of ordinary skill in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Gearboxes and motors are common components in the joints of a robot. A motor 202 usually comprises a brake mechanism to reduce a rotation speed of an arm of a joint quickly or to hold arms of a joint in position. A gearbox 201 is typically provided with an oil cavity for receiving oil to lubricate the individual elements to substantially reduce friction and to fulfill other necessary functions. To make the joint more compact, a motor's shaft is usually inserted into the oil cavity to engage with gears arranged in the oil cavity.

A seal is provided around the motor 202 shaft to prevent oil from entering the motor 202. However, with long periods of operation, the seal surrounding the motor 202 shaft may fail due to long-term wear, which will result in oil entering into the motor 202. The oil entering the motor 202 will accelerate the aging of insulating parts in the motor 202. In addition, and more importantly, once oil enters the motor's brake mechanism, there is a risk of failure of the brake mechanism, which may cause a major accident. For example, if the motor's brake mechanism for stopping or holding the second and third arms fails, the third arm may slip off due to the brake mechanism failure, which may damage surrounding equipment and/or threaten personal safety.

Conventional solutions to prevent oil from entering the motor 202 are to employ a double-seal structure, which comprises two seals. A detection hole is provided between the two seals for an operator to observe oil leaking through one of the seals adjacent to the oil cavity. If the oil is observed through the detection hole, it means that at least one of the two seals is damaged, and the motor 202 or double-seal structure needs to be replaced in time. However, there is currently no way to know if an oil leakage has occurred for the motor 202 wrapped inside a joint.

Figure 1:
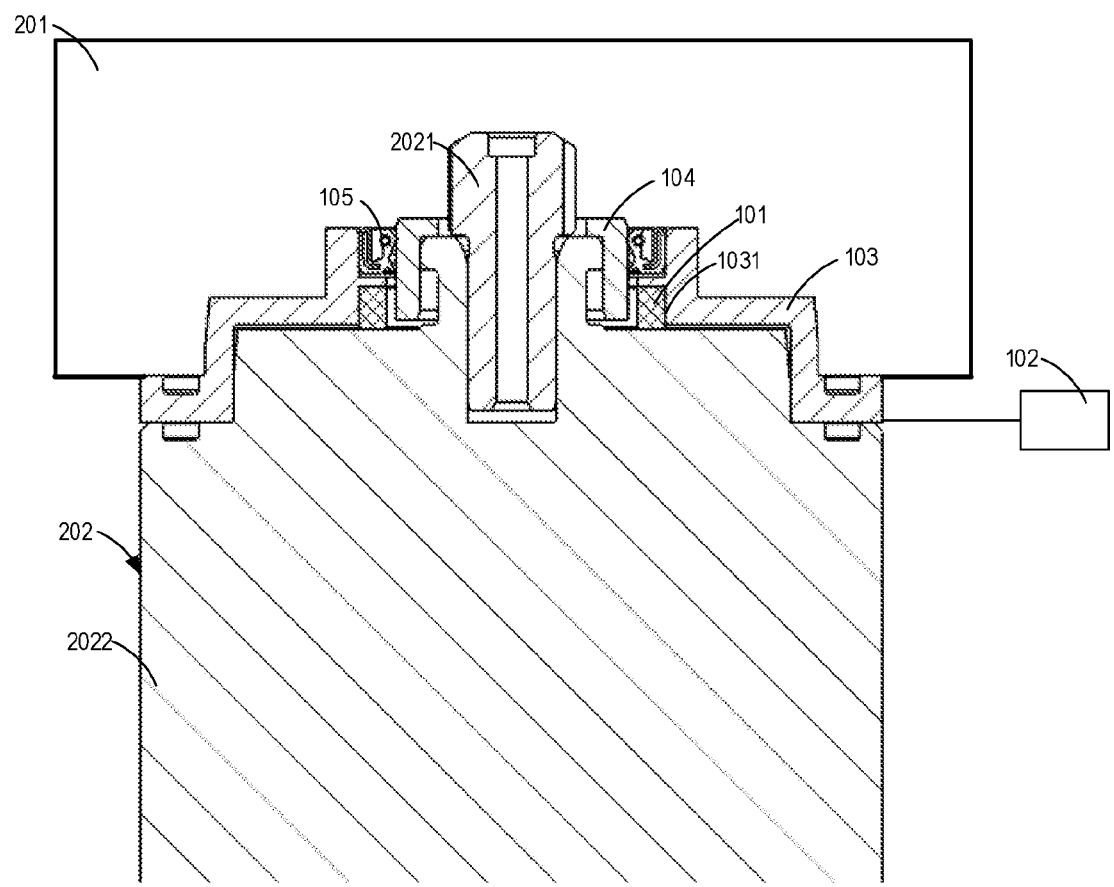
FIG. 1 shows a simplified cross-sectional view of an apparatus for determining oil leakage of a gearbox arranged between a gearbox and a motor according to embodiments of the present disclosure.
Figure 2:
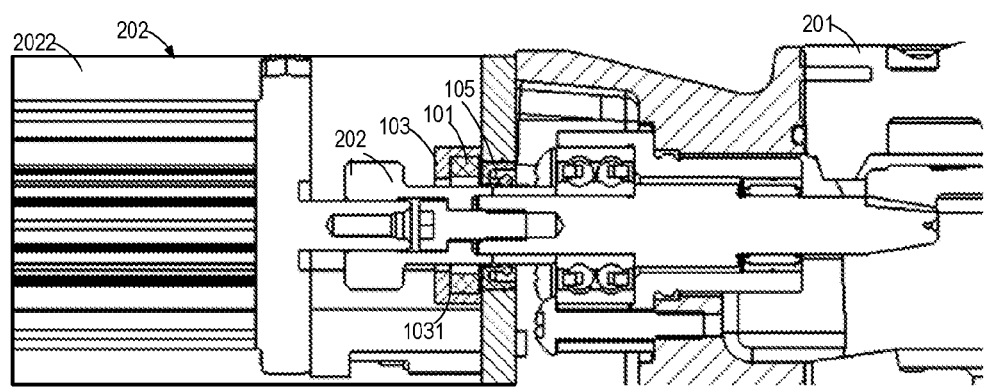
FIG. 2 shows a simplified cross-sectional view of an apparatus for determining oil leakage of a gearbox arranged between a gearbox and a motor according to other embodiments of the present disclosure.

In order to at least partially address the above and other potential problems, embodiments of the present disclosure provide an apparatus 100 for determining oil leakage of a gearbox 201. FIGS. 1 and 2 show simplified cross-sectional views of an apparatus 100 for determining oil leakage of a gearbox 201 arranged between a gearbox 201 and a motor 202 according to embodiments of the present disclosure.

As shown in FIGS. 1 and 2, in general, the apparatus 100 comprises a swellable ring 101 and a controller 102. The swellable ring 101 is arranged surrounding an output shaft 2021 of a motor 202 which is coupled to the gearbox 201. That is, the swellable ring 101 is arranged outside the gearbox 201 but surrounding the output shaft 2021. When the oil does not leak from the gearbox 201, the swellable ring 101 will not contact the output shaft. When contacting oil, the swellable ring 101 can swell to contact the output shaft and apply a radial force to the output shaft 2021.

It can be seen from the above that when there is no oil leaking from the gearbox 201, the swellable ring 101 does not contact the output shaft and the motor 202 can drive the gearbox 201 via the output shaft 2021 to operate normally. When the oil leakage of the gearbox 201 occurs, the swellable ring 101 is arranged so that the oil leaking from the gearbox 201 will first contact the swellable ring 101. As a result, the swellable ring 101 swells to apply the radial force to the output shaft 2021.

Accordingly, the torque on the output shaft 2021 will be changed in response to the radial force applied by the swellable ring 101. Compared to the case where there is no radial force applied, current for driving the motor 202 will be increased accordingly. The controller 102 can detect the torque change on the output shaft 2021 and/or the change in the current for driving the motor 202. In response to a detection of the torque change on the output shaft 2021 and/or the change in the current for driving the motor 202, the controller 102 can determine or detect the oil leakage of the gearbox 201.

In some embodiments, to improve the reliability of the apparatus 100, reference values for the torque on the output shaft 2021 and/or the current for driving the motor 202 may be provided. For example, under normal conditions, that is, without oil leakage, when the robot performs certain predetermined operations, the torque of the output shaft 2021 of the motor 202 or a value of current for driving the motor 202 can be recorded as the reference values. The predetermined operations may be some operations routinely performed by the robot.

The controller 102 will detect the torque and/or the current during each subsequent predetermined operation. If differences between the torque and/or current and the reference values exceed corresponding threshold values, the controller 102 can determine that the swellable ring 101 has exerted a radial force on the output shaft 2021. The radial force applied by the swellable ring 101 implies that the swellable ring 101 is in contact with oil leaking from the gearbox 201. Thus, the controller 102 can then determine or detect the oil leakage by detecting the torque change on the output shaft 2021 and/or the change in the current for driving the motor 202.

The controller 102 may also determine that the increase in the torque or the current is not caused by other factors. For example, in some embodiments, the controller 102 may also employ other sensors, such as load sensors, coupled to the robot to determine that the increase in the torque or the current is caused by the radial force exerted by the swellable ring, rather than other factors such as an increase in loads applied on the robot.

In some embodiments, the apparatus 100 can also inform users about the determined oil leakage. For example, when the controller 102 determines that an oil leakage of the gearbox 201 has occurred, the controller 102 may directly, or indirectly through other controllers 102, push notification or warning of the oil leakage to an external device such as a cell phone used by the user. Alternatively or additionally, the controller 102 may also be configured to stop the motor 202 when determining an oil leakage before notifying or warning users. In some embodiments, the controller 102 may be a controller 102 of a robot in which the apparatus 100 is used. In some alternative embodiments, the controller 102 may also be a controller 102 independent of the controller 102 of the robot.

In this way, before oil leaks into the motor 202, the user already knows, or the motor 202 has already been stopped. In this case, the user may only need to replace the damaged seal ring to restore the robot joint to a normal operation state. In this way, maintenance costs can be reduced. More importantly, the robot using the apparatus 100 according to embodiments of the present disclosure can be operated more safely.

In some embodiments, the motor 202 may detect the change in the current for driving the motor 202 by being coupled to a power cable of the motor 202. As mentioned above, the current for driving the motor 202 varies depending on the torque of the motor's output shaft 2021. In some embodiments, the controller 102 may be coupled to a driver of the motor 202 to detect the change in the current. In this way, the controller 102 can detect or determine the oil leakage of the gearbox 201 more easily.

In some embodiments, the apparatus 100 may also comprise a housing 103 arranged on a fixed part 2022 of the motor 202, as shown in FIGS. 1 and 2. The fixed part 2022 of the motor 202 means an external stationary part of the motor 202. For example, the fixed part 2022 of the motor 202 may be an enclosure of the motor 202. The housing 103 may be arranged on the enclosure of the motor 202 in any suitable way, for example, by interference fits, fastener connections, etc. The housing 103 comprises a receiving portion 1031 for receiving the base. As a result, the apparatus 100 can be easily mounted between the motor 202 and the gearbox 201.

To ensure that a sufficient radial force can be applied to the output shaft 2021 by the swellable ring 101, in some embodiments, the swellable ring 101 is arranged in contact with a side of the receiving portion 1031 away from the output shaft 2021, as shown in FIGS. 1 and 2. In this way, the swellable ring 101 is able to expand more towards the output shaft 2021 to exert the sufficient radial force on the output shaft 2021.

In some embodiments, the swellable ring 101 may comprise a swelling portion 1011 made of a functional oil-absorbing material that can swell when contacting oil. For example, in some embodiments, the functional oil-absorbing material comprises an oil swelling rubber. That is, the swelling portion 1011 may be made of an oil swelling rubber. The oil swelling rubber is a type of polymer functional oil-absorbing material, which mainly comprises a rubber matrix and lipophilic functional groups or lipophilic components. The swelling portion 1011 made of the oil swelling rubber can swell when contacting oil. Further, the swelling portion 1011 can act as a further seal to prevent oil from entering the motor 202.

Of course, it is to be understood that the embodiments where the functional oil-absorbing material comprises an oil swelling rubber are merely for illustrative purposes, without suggesting any limitation as to the scope of the present disclosure. Any other suitable material that can swell when exposed to or contacting oil is also possible. For example, in some alternative embodiments, the functional oil-absorbing material may also comprise a polymer material such as resins that swell when exposed to oil.

In some embodiments, the entire body of the swellable ring 101 may be composed of the oil swelling rubber. To ensure sufficient radial force is applied to the output shaft 2021, in some embodiments, the oil swelling rubber can be modified to be able to exert sufficient radial force during expansion.

Figure 3:
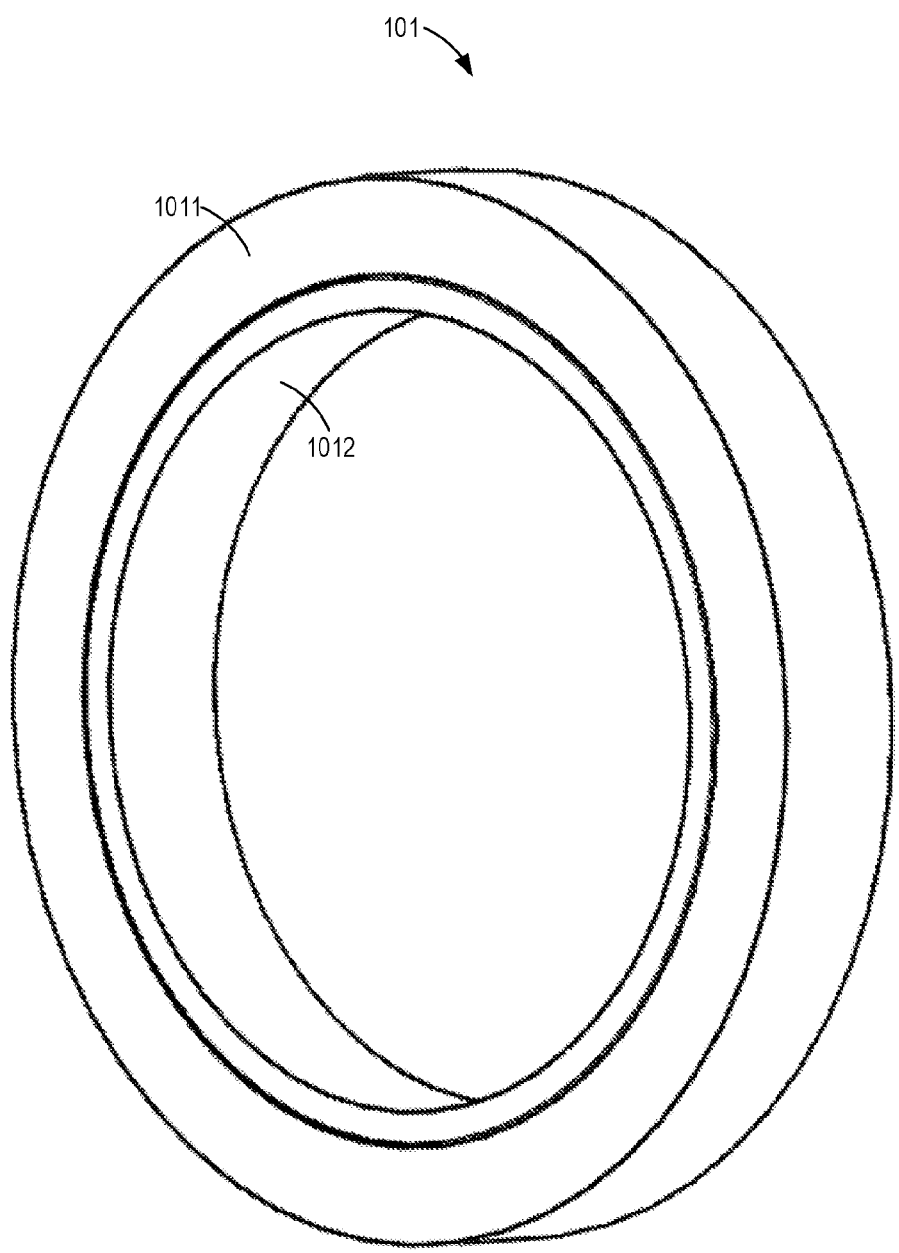
FIG. 3 shows a perspective view of an apparatus according to further embodiments of the present disclosure.

In some embodiments, as shown in FIG. 3, besides the swelling portion 1011, the swellable ring 101 may further comprise a contacting portion 1012. The contacting portion 1012 is arranged on a side of the swelling portion 1011 adjacent to the output shaft 2021 in a radial direction. The contacting portion 1012 may be made of a nitrile rubber, which has higher hardness and lower deformability than oil swelling rubber. By means of the contacting portion 1012, the swellable ring 101 can exert sufficient radial force on the output shaft 2021.

Of course, it is to be understood that the embodiments where the contacting portion 1012 made of the nitrile rubber are merely for illustrative purposes, without suggesting any limitation as to the scope of the present disclosure. Other material or structure that has higher hardness and/or lower deformability than oil swelling rubber is also possible. For example, the contacting portion 1012 may also be made of a metal or a plastic material, etc. In some embodiments, the contacting portion 1012 may comprise a plurality of segments, uniformly disposed on the radial inner side of the swelling portion 1011.

In some embodiments, the apparatus 100 may also comprise a radial sealing 105 between the output shaft 2021 of the motor 202 and the housing 103, as shown in FIGS. 1 and 2. The radial sealing 105 can provide an additional sealing protection to the oil cavity of the gearbox 201. The oil leaking from the gearbox 201 will be first blocked from leaking outside of the apparatus 100 due to the radial sealing 105, without affecting the motor 202. Even if the radial sealing 105 is damaged, the oil leakage can be known in time before it enters the motor 202. It is only necessary to replace seals of the gearbox 201 and the radial sealing 105 of the apparatus 100, without replacing the motor 202 or the entire joint, which significantly reduces the cost.

In some embodiments, in order to improve adaptability, the apparatus 100 may further comprise an additional sleeve 104, as shown in FIG. 1. The additional sleeve 104 may be arranged on the output shaft 2021 of the motor 202 and can rotate with the output shaft 2021. In those embodiments, the radial sealing 105 and the swellable ring 101 are arranged between the additional sleeve 104 and the housing 103. In this way, no matter the structure of the output shaft 2021 of the motor 202, the apparatus 100 can be applied to it. As a result, the apparatus 100 can be applied to various motors, which significantly improves the adaptability of the apparatus 100.

According to other aspects of the present disclosure, a robot is provided. The robot comprises at least one joint and at least one apparatus 100 as mentioned above. With the apparatus 100 according to embodiments of the present disclosure, the oil leakage of the gearbox 201 can be determined in time before affecting the performance of the motor 202. In this way, the reliability of the robot is improved.

It should be appreciated that the above detailed embodiments of the present disclosure are only to exemplify or explain principles of the present disclosure and not to limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. An apparatus for determining oil leakage of a gearbox, comprising:
   a swellable ring arranged surrounding an output shaft of a motor coupled to the gearbox, the swellable ring, when contacting oil, swells to apply an radial force to the output shaft; and
   a controller configured to detect the oil leakage by detecting at least one of the following caused by the applied radial force: a torque change on the output shaft, or a change in a current for driving the motor.

2. The apparatus of claim 1, wherein the controller is coupled to a power cable or a driver of the motor to detect the change in the current for driving the motor.

3. A robot, comprising:
   at least one joint; and
   at least one apparatus of claim 1 arranged on the at least one joint.

4. The apparatus of claim 1, wherein the swellable ring comprises a swelling portion made of a functional oil-absorbing material such that the swelling portion swells when the swelling portion contacts oil.

5. The apparatus of claim 4, wherein the swellable ring further comprises a contacting portion arranged on a side of the swelling portion adjacent to the output shaft in a radial direction, and wherein the contacting portion is made of a nitrile rubber.

6. The apparatus of claim 5, further comprising:
   an additional sleeve arranged on the output shaft and adapted to rotate with the output shaft.

7. The apparatus of claim 4, wherein the functional oil-absorbing material comprises an oil swelling rubber.

8. The apparatus of claim 7, further comprising:
   an additional sleeve arranged on the output shaft and adapted to rotate with the output shaft.

9. The apparatus of claim 1, further comprising:
   a housing arranged on a fixed part of the motor and comprising a receiving portion for receiving the swellable ring.

10. The apparatus of claim 9, further comprising:
    an additional sleeve arranged on the output shaft and adapted to rotate with the output shaft.

11. The apparatus of claim 10, wherein the swellable ring is arranged between the additional sleeve and the housing.

12. The apparatus of claim 10, further comprising:
    a radial sealing arranged between the additional sleeve and the housing.

13. The apparatus of claim 9, wherein the swellable ring comprises a swelling portion made of a functional oil-absorbing material such that the swelling portion swells when the swelling portion contacts oil.

14. The apparatus of claim 13, wherein the swellable ring further comprises a contacting portion arranged on a side of the swelling portion adjacent to the output shaft in a radial direction, and wherein the contacting portion is made of a nitrile rubber.

15. The apparatus of claim 13, wherein the functional oil-absorbing material comprises an oil swelling rubber.

16. The apparatus of claim 9, wherein the swellable ring is arranged in contact with a side of the receiving portion away from the output shaft.

17. The apparatus of claim 16, further comprising:
    an additional sleeve arranged on the output shaft and adapted to rotate with the output shaft.

18. The apparatus of claim 16, wherein the swellable ring comprises a swelling portion made of a functional oil-absorbing material such that the swelling portion swells when the swelling portion contacts oil.

19. The apparatus of claim 18, wherein the swellable ring further comprises a contacting portion arranged on a side of the swelling portion adjacent to the output shaft in a radial direction, and wherein the contacting portion is made of a nitrile rubber.

20. The apparatus of claim 18, wherein the functional oil-absorbing material comprises an oil swelling rubber.

* * * * *